(12) United States Patent  (10) Patent No.: US 8,978,043 B1
Geisinger et al.  (45) Date of Patent: *Mar. 10, 2015

(54) BALANCING A LOAD ON A MULTIPLE CONSUMER QUEUE

(75) Inventors: Nile Josiah Geisinger, Seattle, WA (US); Joseph J. Gleason, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/619,329

(22) Filed: Sep. 14, 2012

Related U.S. Application Data

(63) Continuation of application No. 12/821,299, filed on Jun. 23, 2010, now Pat. No. 8,336,058.

(51) Int. Cl.
*G06F 3/00* (2006.01)
*G06F 9/54* (2006.01)
*G06F 13/362* (2006.01)

(52) U.S. Cl.
CPC .............. *G06F 9/548* (2013.01); *G06F 13/362* (2013.01)
USPC ....................................................... 719/314

(58) Field of Classification Search
CPC ..... G06F 2209/548; G06F 9/54; G06F 9/548; G06F 13/362
See application file for complete search history.

(56) References Cited

U.S. PATENT DOCUMENTS

| | | | | |
|---|---|---|---|---|
| 4,590,586 | A | * | 5/1986 | Zenk et al. ................ 711/151 |
| 5,742,789 | A | * | 4/1998 | Ofer et al. ................ 711/111 |
| 7,293,200 | B2 | * | 11/2007 | Neary et al. ................ 714/35 |
| 7,484,217 | B2 | * | 1/2009 | Hwang ................ 719/314 |
| 8,336,058 | B1 | | 12/2012 | Geisinger et al. |
| 2013/0051234 | A1 | * | 2/2013 | Matsuoka ................ 370/235 |

OTHER PUBLICATIONS

Mohammad Ali Arad, Scheduled CDMA: A Hybird Multiple Access for Wireless ATM networks, 1996.*
M. Harkema, "Performance of Comparison of Middleware Threading Strategies", 2004.

* cited by examiner

*Primary Examiner* — Lechi Truong
(74) *Attorney, Agent, or Firm* — Thomas|Horstemeyer, LLP

(57) ABSTRACT

Disclosed are various embodiments for balancing a load on a queue among multiple consumers. A target polling hit rate is derived for at least one queue from a consumer load. The consumer load dictates a read rate of the at least one queue. The consumer load on the at least one queue is adjusted responsive to a difference between the target polling hit rate and an observed polling hit rate for the at least one queue.

20 Claims, 6 Drawing Sheets

BALANCING A LOAD ON A MULTIPLE CONSUMER QUEUE

CROSS REFERENCE TO RELATED APPLICATIONS

This application is a continuation of U.S. application Ser. No. 12/821,299, filed on Jun. 23, 2010, now U.S. Pat. No. 8,336,058, which is incorporated by reference in its entirety herein.

BACKGROUND

Queues are used as a method of communicating between software entities. One or more producers add items to a queue that is managed by a server, and one or more consumers remove items from the queue. The server provides asynchronous operation for producers and consumers, such that a producer is not required to wait for a consumer to finish accessing the queue, and vice versa. The queue read operation uses polling, such that a consumer checks to see if any data is available before removal.

In scenarios involving many consumers, significant server resources are used to handle the polls. Significant consumer resources are also used in competing with each other for access to the queue. This can lead to an imbalance between consumers, such that some consumers get an increased and disproportionate access to the queue while other consumers receive inadequate access.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to balancing a load on a queue having multiple consumers. In various embodiments, the present disclosure provides a mechanism for balancing consumer access to a queue managed by a server. This mechanism balances the tradeoff between performance of the queue consumer and increased load on the server. Each consumer periodically calculates and stores a polling hit rate, which is a measure of successful reads. The polling hit rate is used as an indirect communication mechanism between consumers, allowing each consumer to tune its read rate for the queue. A predetermined relationship between polling hit rate and read rate allows a target hit rate to be derived. Each consumer then adjusts its read rate to approach this target hit rate. In the following discussion, a general description of the system and its components is provided, followed by a discussion of the operation of the same.

Figure 1:
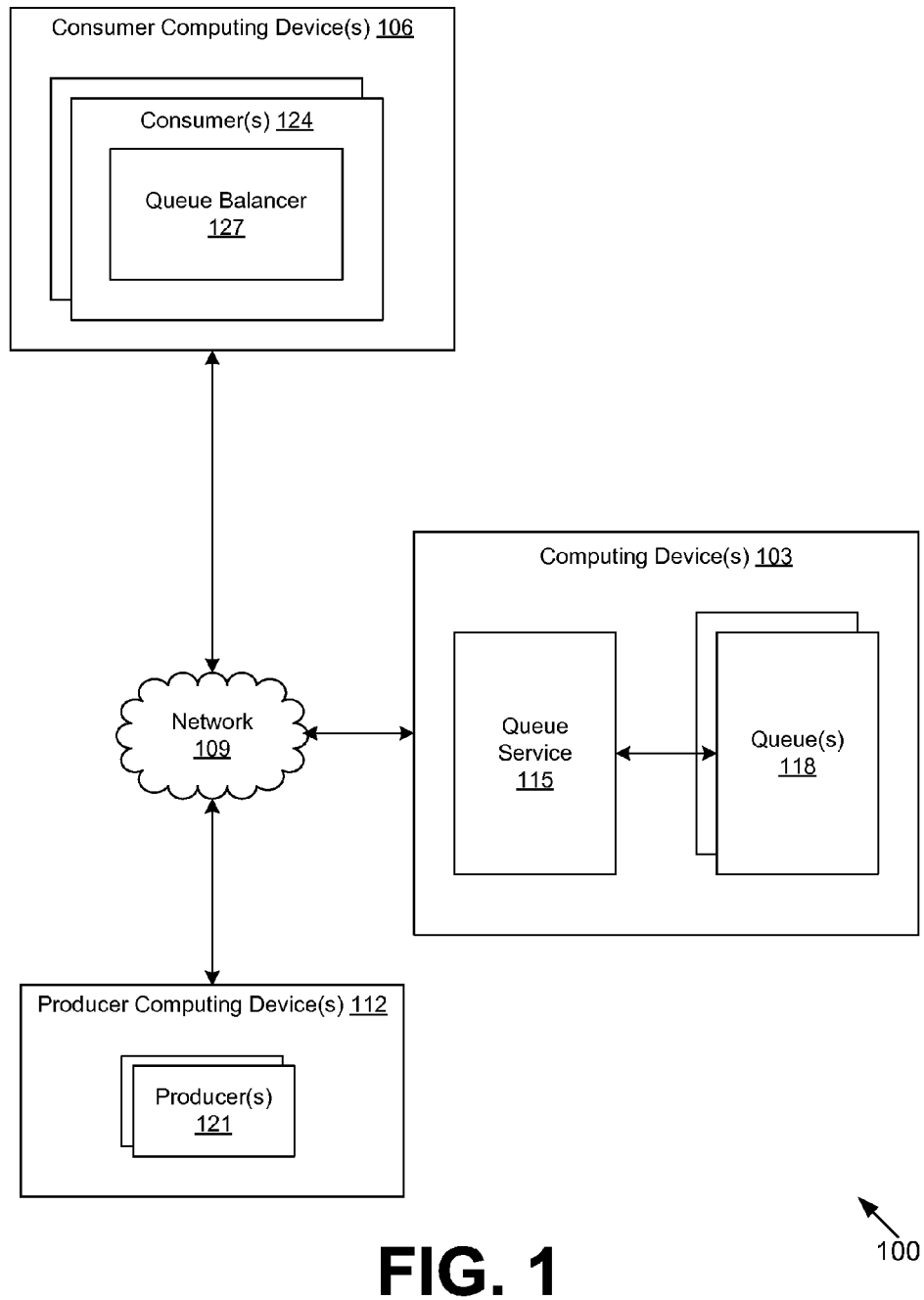
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more consumer computing devices 106 by way of a network 109. The computing device 103 may also be in communication with one or more producer computing devices 112 by way of the network 109. The network 109 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks, computer banks or other arrangements. To this end, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103, for example, include a queue service 115, as well as other applications, services, processes, systems, engines, or functionality not discussed in detail herein. The queue service 115 is executed to provide coordinated access to one or more queues 118. In some embodiments, a queue 118 may reside on a particular computing device 103. In other embodiments, a queue 118 may be distributed among more than one computing device 103. The queue service 115 provides a mechanism through which a producer and a consumer can communicate with each other asynchronously (i.e., without waiting on each other). In various embodiments, the queue service 115 may utilize any type of middleware framework to communicate with a client application executing on a consumer computing device 106 and/or a client application executing on a producer computing device 112. Examples of such frameworks include remote procedure calls, service-oriented architecture protocol (SOAP), representational state transfer (REST), and other frameworks. In some embodiments, a queue 118 may reside on a particular computing device 103. In other embodiments, a queue 118 may be distributed among more than one computing device 103.

The consumer computing device 106 and the producer computing device 112 are representative of a plurality of client devices that may be coupled to the network 109. The consumer computing device 106 may comprise, for example, a processor-based system such as a computer system. Such a computer system may be embodied in the form of a server computer, a desktop computer, a laptop computer, a personal digital assistant, a cellular telephone, a set-top box, a music player, a web pad, a tablet computer system, or other devices with like capability.

A producer computing device 112 may be configured to execute various components such as one or more producers 121. A producer 121 is associated with at least one queue 118, and may be executed in a producer computing device 112, for example, to add data items to the associated queue 118 using the queue service 115. These data items may be of a variety of types and sizes.

A consumer computing device 106 may be configured to execute various components such as one or more consumers 124. A consumer 124 is associated with at least one queue 118, and may be executed in a consumer computing device 106, for example, to remove data items from the associated queue 118 using the queue service 115. The consumer 124 may include an instance of a queue balancer 127 that is configured to adjust a consumer load on the queue 118. This adjustment balances the queue removal rate (also known as read rate) among multiple consumers 124 that are accessing the same queue 118. Some embodiments of the queue balancer 127 utilize multiple consumer threads to read from the queue. In some embodiments of the queue balancer 127, the load is described by the number of consumer threads reading from the queue 118. In other embodiments of the queue balancer 127, the load is described by the time between reads. In still other embodiments of the queue balancer 127, the load is described by the current queue depth (i.e., the number of items in the queue).

A given consumer computing device 106 may be configured to execute one or more consumers 124, producers 121, or both. The consumer computing device 106 may also be configured to execute components and applications beyond the consumer 124 and/or producer 121 such as, for example, browser applications, email applications, instant message applications, and/or other applications.

Figure 2:
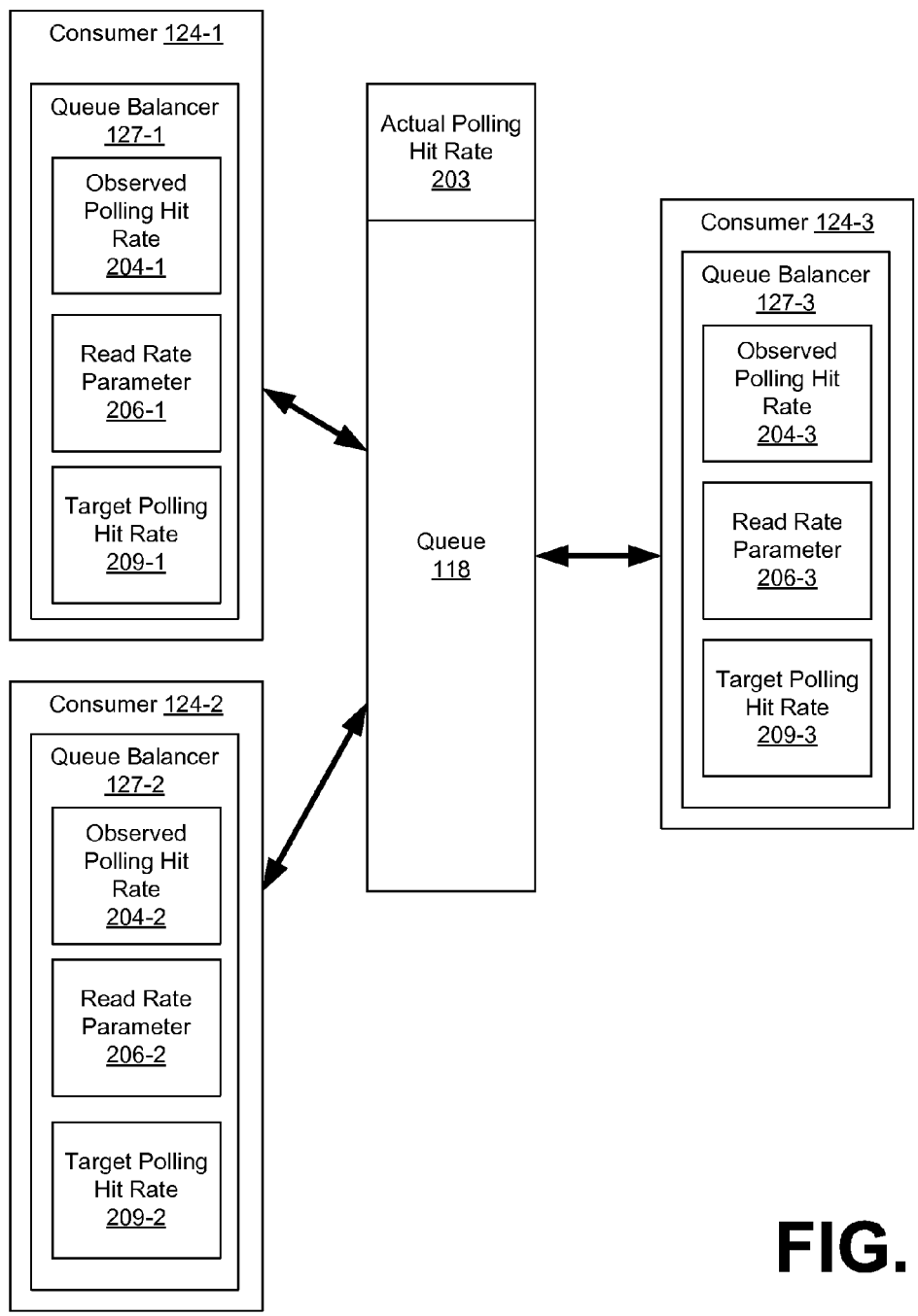
FIG. 2 is a block diagram illustrating one example of the operation of a portion of a queue balancer in a computing device in the networked environment of FIG. 1 according to various embodiments of the present disclosure.

Moving now to FIG. 2, shown is a block diagram that provides one example of the operation of a portion of the queue balancer 127 according to various embodiments. In this example, three consumers 124-1, 124-2, 124-3, compete to read from the queue 118. Each consumer 124-1, 124-2, 124-3 includes a corresponding instance of the queue balancer 127-1, 127-2, 127-3.

Associated with the queue 118 is an actual polling hit rate 203 defined as the number of successful reads divided by the total number of attempted reads. Each instance of the queue balancer 127-1, 127-2, 127-3 maintains an observed polling hit rate 204-1, 204-2, and 204-3. As each consumer 124-1, 124-2, 124-3 attempts a read from the queue 118, the corresponding observed polling hit rate 204-1, 204-2, and 204-3 is updated. Thus, each observed polling hit rate 204-1, 204-2 and 204-3 can be viewed as a reflection of, or a proxy for, the actual polling hit rate 203.

Each queue balancer 127-1, 127-2, 127-3 has a read rate parameter 206-1, 206-2, 206-3 which controls queue read behavior. That is, the read rate parameter 206-1, 206-2, 206-3 dictates how often the queue balancer 127-1, 127-2, 127-3 attempts to read from the queue 118. In some embodiments, the read rate parameter 206-1, 206-2, 206-3 is the number of threads used by the queue balancer 127-1, 127-2, 127-3 to read from the queue 118. In other embodiments, the read rate parameter 206-1, 206-2, 206-3 is the time between reads, or (inversely) the read rate. In some embodiments, a range is specified for the read rate parameter 206-1, 206-2, 206-3.

Each queue balancer 127-1, 127-2, 127-3 has its own target polling hit rate 209-1, 209-2, 209-3. Each queue balancer 127-1, 127-2, 127-3 then adjusts its read rate parameter 206-1, 206-2, 206-3 based on a comparison of its target polling hit rate 209-1, 209-2, 209-3 and its observed polling hit rate 204-1, 204-2, and 204-3. In this manner, the observed polling hit rate 204-1, 204-2, and 204-3 is used to tune each queue balancer 127-1, 127-2, 127-3. In some embodiments, a range is specified for the target polling hit rate 209-1, 209-2, 209-3. In such embodiments, each queue balancer 127-1, 127-2, 127-3 uses the target range and the read rate parameter 206-1, 206-2, 206-3 to derive the target polling hit rate 209-1, 209-2, 209-3, which is then used to adjust the read rate parameter 206-1, 206-2, 206-3.

The queue balancer 127 uses a predetermined relationship between the read rate parameter 206-1, 206-2, 206-3 and the target polling hit rate 209-1, 209-2, 209-3, which results in the read behavior of consumers 124-1, 124-2, 124-3 balancing relative to each other. As a particular consumer 124-1 reaches its maximum load on the queue 118 (e.g., number of threads), the addition of another consumer 124-2 results in the high consumer 124-1 reducing its load due to a reduction in the observed polling hit rate 203-1 (i.e., more read misses). The new consumer 124-2 increases its load on the queue 118 until the new consumer 124-2 sees a reduction in the observed polling hit rate 203-2. At that point, the consumers 124-1, 124-2 balance at approximately the same target polling hit rate 209-1, 209-2.

Figure 3:
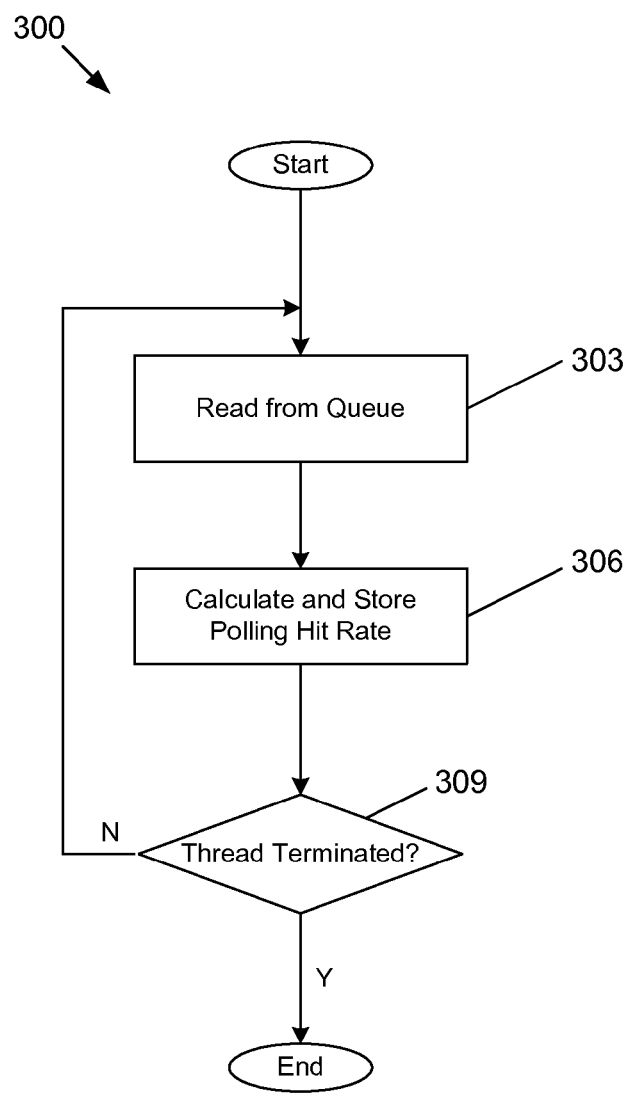
FIG. 3 is a flowchart illustrating one example of functionality implemented as a portion of a queue balancer in a computing device in the networked environment of FIG. 1 according to various embodiments of the present disclosure.

The operation of the queue balancer 127-1, as shown in FIG. 3, involves different threads of control. One thread adjusts the load on the queue 118 (FIG. 1). Other threads read from the queue 118. In some embodiments, load is adjusted by adding and deleting read threads. In other embodiments, a fixed number of read threads is used and the load is adjusted by varying time between reads in a thread. In still other embodiments, load is adjusted by taking into account additional parameters like queue depth.

Turning now to FIG. 3, shown is a flowchart that provides one example of the operation of a portion of the queue balancer 127-1 according to various embodiments. Specifically, the flowchart of FIG. 3 illustrates the operation of a read thread 300. It is understood that the flowchart of FIG. 3 provides merely an example of the many different types of functional arrangements that may be employed to implement the operation of the portion of the queue balancer 127-1 as described herein. As an alternative, the flowchart of FIG. 3 may be viewed as depicting an example of steps of a method implemented in the consumer computing device 106 (FIG. 1) according to one or more embodiments.

The read thread 300 begins with box 303 reading from the queue 118. Next, in box 306, the read thread 300 calculates the observed polling hit rate 203-1 (FIG. 2) and stores this value. This calculation may perform a non-blocking read operation on the queue 118. In some embodiments, the read thread 300 stores not only the last hit rate, but also previous hit rates. The queue balancer 127-1 can use this hit rate history to compute an average of past hit rates rather than a single last value, and this average may be used in place of a last value. This average may be, for example, a moving or rolling average of a predetermined number of values.

Next, in box 309, a determination is made as to whether the read thread 300 has been terminated. If, in box 309, the determination is made that the read thread 300 has not been terminated, the read thread 300 repeats boxes 303 and 306. If, instead in box 309 the determination is made that the read thread 300 has been terminated, the thread ends.

Figure 4:
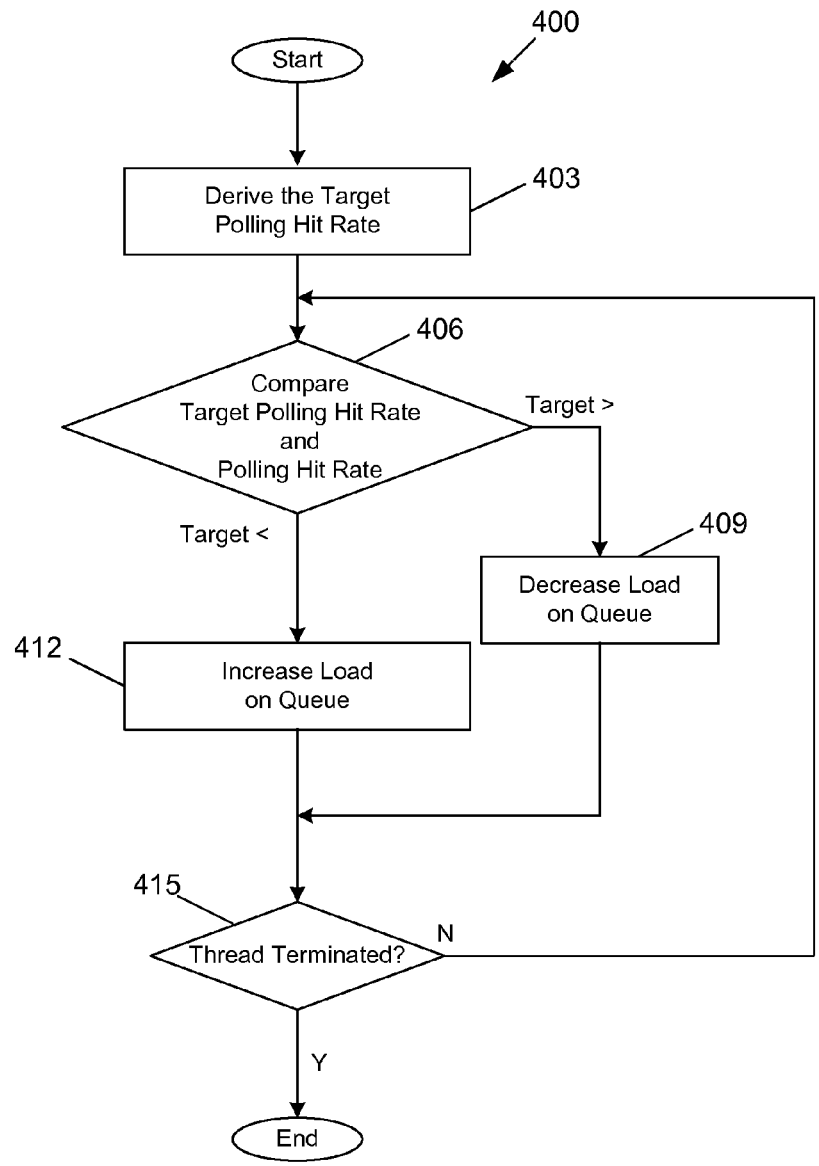
FIG. 4 is a flowchart illustrating one example of functionality implemented as another portion of a queue balancer in a computing device in the networked environment of FIG. 1 according to various embodiments of the present disclosure.

With reference now to FIG. 4, shown is a flowchart that provides one example of the operation of a portion of the queue balancer 127-1 according to various embodiments. Specifically, the flowchart of FIG. 4 illustrates the operation of a load adjuster thread 400. It is understood that the flowchart of FIG. 4 provides merely an example of the many different types of functional arrangements that may be employed to implement the operation of the portion of the queue balancer 127-1 as described herein. As an alternative, the flowchart of FIG. 3 may be viewed as depicting an example of steps of a method implemented in the consumer computing device 106 (FIG. 1) according to one or more embodiments.

The load adjuster thread 400 begins with box 403 deriving the target polling hit rate 209-1 (FIG. 2) based on the consumer load on the queue 118. In some embodiments, the consumer load is measured by the number of threads reading from the queue 118. In other embodiments, the consumer load is measured by the time between reads from the queue 118.

Next, in box 406, the load adjuster thread 400 compares the target polling hit rate 209-1 and the last calculated observed polling hit rate 203-1. If, in box 406, the load adjuster thread 400 determines that the target polling hit rate 209-1 is more than the last calculated observed polling hit rate 203-1, the load adjuster thread 400 moves to box 409. In box 409, the load adjuster thread 400 decreases the load based on the comparison. If, instead in box 406 the load adjuster thread 400 determines that the target polling hit rate 209-1 is less than the observed polling hit rate 203-1, the load adjuster thread 400 moves to box 412. In box 412, the load adjuster thread 400 decreases the load based on the comparison. Next, in box 415, a determination is made as to whether the load adjuster thread 400 has been terminated. If, in box 415, the determination is made that the load adjuster thread 400 has not been terminated, the load adjuster thread 400 repeats boxes 406, 409, 412, and 415. If, instead in box 415 the determination is made that the load adjuster thread 400 has been terminated, the thread ends.

The load adjuster thread 400 and the read thread 300 interact as follows. The number of read misses by the read thread 300 is affected by the increase or decrease in load on the queue 118 caused by the load adjuster thread 400. This behavior is reflected in a change to the observed polling hit rate 203-1, which is calculated and stored by the read thread 300. The change in the observed polling hit rate 203-1 in turn affects the behavior of the load adjuster thread 400, since the load adjuster thread 400 uses the observed polling hit rate 203-1 in determining how to adjust the load on the queue 118.

Figure 5:
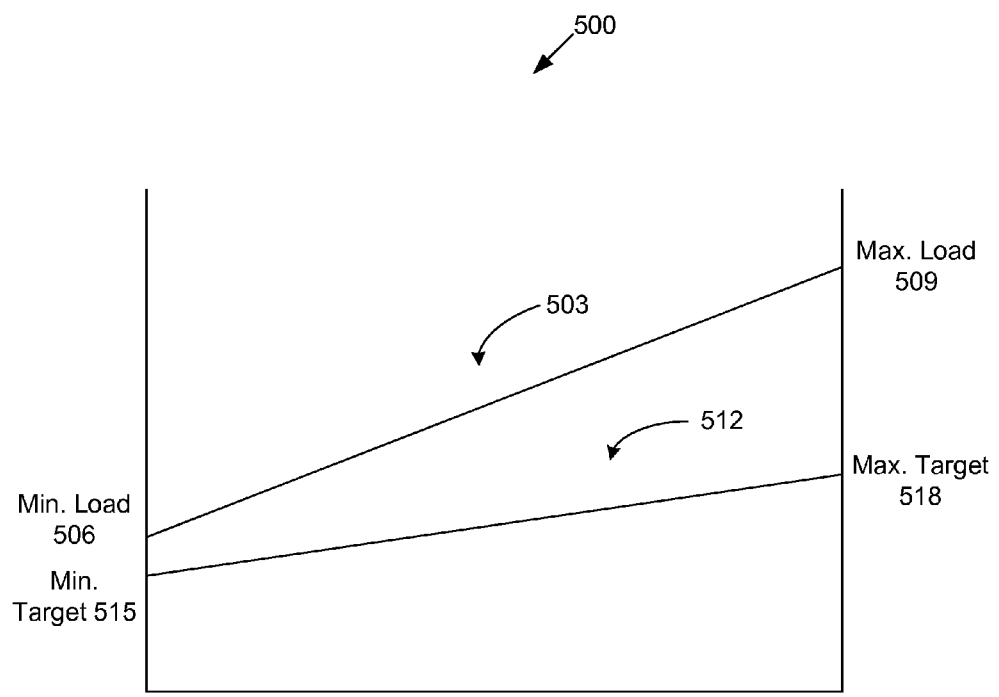
FIG. 5 is a graph illustrating a relationship between a load on a queue and a target polling hit rate according to various embodiments of the present disclosure.

Reference is now made to FIG. 5, which depicts a graph 500 showing how a change in the load on the queue 118 (FIG. 1) affects the target polling hit rate 209-1 (FIG. 2). Line 503 is a plot of the load on the queue 118. In some embodiments, the load corresponds to a read rate parameter 206-1 used by the queue balancer 127-1. The load ranges from a minimum load 506 to a maximum load 509. Line 512 is a corresponding plot of the target polling hit rate 209-1, ranging from a minimum target 515 to a maximum target 518. The lines 503, 512 may be generated in a variety of ways, for example, using empirical data, theoretical prediction, heuristics, etc. Although straight lines are used in this example, in other scenarios line 503 and/or line 512 may be strictly increasing curves.

As can be seen from graph, each position on the load line 503 has a corresponding position on the target polling hit rate line 512 that can be derived from the load. That is, given a current (or last stored) load on the queue 115, the target polling hit rate 209-1 that is desired for that load can be computed by mapping the position of the load along the load range to a corresponding position along the target range.

Given this relationship between load on the queue 118 and the target polling hit rate 209-1, the derivation can be performed in a variety of ways. Some embodiments determine where the load falls within the load range to produce a scaling factor, and then apply that scaling factor to the target range to produce the target polling hit rate 209-1. Other embodiments use a lookup table rather than performing calculations, which may be desirable when such calculations are complex, for example, in situations where the load is not linear.

Figure 6:
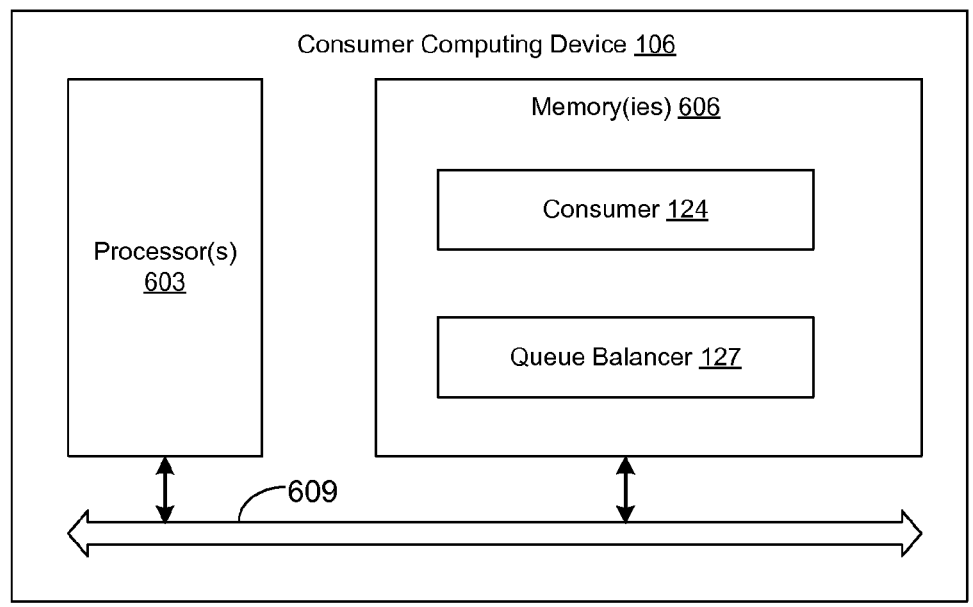
FIG. 6 is a schematic block diagram that provides one example illustration of a computing device employed in the networked environment of FIG. 1 according to various embodiments of the present disclosure.

Referring next to FIG. 6, shown is a schematic block diagram of the consumer computing device 106 according to an embodiment of the present disclosure. The consumer computing device 106 includes at least one processor circuit, for example, having a processor 603 and a memory 606, both of which are coupled to a local interface 609. To this end, the consumer computing device 106 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the consumer 124, the queue balancer 127, and potentially other components and applications. In addition, an operating system may be stored in the memory 606 and executable by the processor 603. While not illustrated, the computing device 103 also includes components like those shown in FIG. 6, whereby the queue service 115 and the queue 118 are stored in a memory and executable by a processor.

It is understood that there may be other components and applications that are stored in the memory 606 and are executable by the processor 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the consumer 124, the queue balancer 127, the queue service 115, the queue service 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the queue balancer 127-1. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the consumer 124, the queue balancer 127, the queue service 115, and the queue 118, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    deriving, in a computing device, a target polling hit rate for at least one queue from a consumer load, the consumer load being described by a number of threads that read from the at least one queue and dictating a read rate of the at least one queue, the target polling hit rate being based at least upon the read rate and an observed polling hit rate, the observed polling hit rate being a number of successful reads divided by a number of attempted reads; and
    adjusting, in the computing device, the consumer load on the at least one queue responsive to a difference between the target polling hit rate and the observed polling hit rate for the at least one queue.

2. The method of claim 1, wherein the consumer load on the at least one queue is further described by the read rate for the at least one queue.

3. The method of claim 1, further comprising comparing, in the at least one computing device, the observed polling hit rate and the target polling hit rate, wherein the adjusting the consumer load is based at least on the comparison.

4. The method of claim 1, further comprising computing, in the at least one computing device, the observed polling hit rate for the at least one queue from a polling hit rate history.

5. The method of claim 1, further comprising computing, in the at least one computing device, the observed polling hit rate for the at least one queue as an average of a plurality of polling hit rates.

6. The method of claim 1, further comprising computing, in the at least one computing device, the observed polling hit rate for the at least one queue as a moving average of a plurality of polling hit rates.

7. The method of claim 1, further comprising computing, in the at least one computing device, the observed polling hit rate for the at least one queue using a non-blocking read.

8. A non-transitory computer-readable medium embodying at least one program executable in at least one computing device, wherein, when executed, the at least one program causes the at least one computing device to at least:
derive a target polling hit rate for at least one queue from a consumer load, the consumer load being described by a number of threads that read from the at least one queue and dictating a read rate of the at least one queue, the target polling hit rate being based at least upon the read rate and an observed polling hit rate, the observed polling hit rate being a number of successful reads divided by a number of attempted reads; and
adjust the consumer load on the at least one queue responsive to detecting a difference between the target polling hit rate and the observed polling hit rate for the at least one queue.

9. The non-transitory computer-readable medium of claim 8, wherein the consumer load is further described by the read rate for the at least one queue.

10. The non-transitory computer-readable medium of claim 9, wherein the read rate is a number of threads read during a predetermined time period from the at least one queue.

11. The non-transitory computer-readable medium of claim 9, wherein the read rate is a time between reads from the at least one queue.

12. The non-transitory computer-readable medium of claim 8, wherein the target polling hit rate is a specified range, and the at least one program, when executed, further causes the at least one computing device to at least:
adjust the consumer load on the at least one queue responsive to detecting that the observed polling hit rate is not within the specified range.

13. The non-transitory computer-readable medium of claim 8, wherein the at least one program, when executed, further causes the at least one computing device to at least:
compare the observed polling hit rate and the target polling hit rate, and wherein the adjusting the consumer load is based at least on the comparison.

14. The non-transitory computer-readable medium of claim 8, wherein the at least one program, when executed, further causes the at least one computing device to at least:
calculate the observed polling hit rate for the at least one queue from a polling hit rate history.

15. The non-transitory computer-readable medium of claim 8, wherein the at least one program, when executed, further causes the at least one computing device to at least:
calculate the observed polling hit rate for the at least one queue as an average of a plurality of polling hit rates.

16. A system, comprising:
at least one computing device including a processor configured to at least:
derive a target polling hit rate for at least one queue from a consumer load, the consumer load being described by a number of threads that read from the at least one queue and dictating a read rate of the at least one queue, the target polling hit rate being based at least upon the read rate and an observed polling hit rate, the observed polling hit rate being a number of successful reads divided by a number of attempted reads; and
adjust the consumer load on the at least one queue responsive to detecting a difference between the target polling hit rate and the observed polling hit rate for the at least one queue.

17. The system of claim 16, wherein the at least one computing device is further configured to least adjust the consumer load by adding or deleting threads of the consumer load that read from the at least one queue.

18. The system of claim 16, wherein the consumer load is described by a fixed number of threads that read from the at least one queue, and the at least one computing device is further configured to at least adjust the consumer load by varying a time between reads in the fixed number of threads.

19. The system of claim 16, wherein the target polling hit rate is a specified range, and the consumer load is adjusted responsive to detecting that the observed polling hit rate is not within the specified range.

20. The system of claim 16, wherein the observed polling hit rate for the at least one queue is calculated as an average of a plurality of polling hit rates.

* * * * *